(12) United States Patent
Garlick

(10) Patent No.: US 7,640,421 B1
(45) Date of Patent: Dec. 29, 2009

(54) METHOD AND SYSTEM FOR DETERMINING CONTEXT SWITCH STATE

(75) Inventor: Benjamin J. Garlick, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 169 days.

(21) Appl. No.: 11/460,698

(22) Filed: Jul. 28, 2006

(51) Int. Cl.
*G06F 9/50* (2006.01)
(52) U.S. Cl. .................................................. 712/228
(58) Field of Classification Search .................. 712/228
See application file for complete search history.

(56) References Cited

U.S. PATENT DOCUMENTS

| 6,408,433 | B1* | 6/2002 | Click et al. ................. 717/154 |
| 6,944,639 | B2* | 9/2005 | Launiainen .................. 708/270 |
| 6,985,150 | B2* | 1/2006 | Deering ....................... 345/506 |
| 7,089,387 | B2* | 8/2006 | Ganfield et al. ............. 711/163 |
| 7,162,716 | B2* | 1/2007 | Glanville et al. ............ 717/151 |
| 7,234,144 | B2* | 6/2007 | Wilt et al. ................... 718/104 |
| 2002/0013938 | A1* | 1/2002 | Duesterwald et al. .......... 717/9 |
| 2004/0128660 | A1* | 7/2004 | Nair et al. ................... 717/156 |
| 2004/0221280 | A1* | 11/2004 | Bolton et al. ............... 717/151 |
| 2006/0161908 | A1* | 7/2006 | Bearman et al. ............ 717/162 |

* cited by examiner

*Primary Examiner*—Eric Coleman
(74) *Attorney, Agent, or Firm*—Patterson & Sheridan, LLP

(57) ABSTRACT

A method and apparatus for automatically generating a list of circuit elements, such as registers, to be context switched designed to avoid the omission of elements that must be context switched are provided. The method generally involves creating a list of potential elements for context switching, assuming these elements will be context switched by default, and then excluding all elements that must not be context switched.

20 Claims, 5 Drawing Sheets

METHOD AND SYSTEM FOR DETERMINING CONTEXT SWITCH STATE

BACKGROUND OF THE INVENTION

1. Field of the Invention

Embodiments of the present invention generally relate to the field of graphics hardware and, more particularly, to a system for automatically creating a list of states that need to be context switched within a graphics processing unit (GPU).

2. Description of the Related Art

Modern graphics complexity and speed require specialized logic chips called graphics processing units (GPUs) devoted to the fast rendering of three-dimensional (3-D) colored, textured images. Somewhat similar to a central processing unit (CPU), a GPU has a highly-parallel structure combined with a primitive, limited function set that enables the GPU to be much more efficient than a typical CPU at graphics rendering.

In order to perform the myriad of graphics processes required in a parallel, time-sharing fashion, contemporary GPUs must be capable of managing multiple states called contexts. A graphics context contains the current set of attributes for a particular process, which may include the matrix stack, light sources, shading control, spline basis matrices, and other hardware state information. The method of stopping a currently running process, storing the context of this process, restoring the context of an inactive process that had been previously stored, and activating the new process is called context switching. A state-of-the-art GPU must be able to quickly and efficiently context switch so that multiple operations can be executed seamlessly using only a single resource.

During a context switch, the storage elements used for storing and retrieving the context may be registers. Conventionally, the registers that are context switched need to be listed out, and a hardware state machine is created to generate this list within the silicon of the GPU. An example of such a hardware state machine 100 is illustrated in FIG. 1. In state 0 102, the instruction to save register A to the list of registers that are context switched is performed, and then the state machine moves to state 1 104, which includes a similar instruction for register B. This operation continues down the steps of the state machine for each register that is context switched until the last state n 106 is reached. This method is acceptable as long as all of the registers that need to be context switched were instructed to be saved to the list in the state machine 100.

With a long list of registers that need to be context switched, it is easy to overlook a few such registers and accidentally exclude them from instructions within the state machine 100. Furthermore, new registers are frequently added during the design phase of the GPU, and some of these may need to be context switched. In either case, adding even a single overlooked or new register to the list of registers that need to be context switched via the hardware state machine 100 requires a new instruction 108. However, once the GPU has been fabricated on a wafer, it is too late to add a new instruction 108, and any such GPUs that have made it into the field now have a context switching bug where the context of the overlooked state may bleed over into the next state (i.e. at least a portion of the original context erroneously remains in the register after a context switch). In this situation, GPU manufacturers may have to incur a costly semiconductor revision in order to fix the bug and replace defective units.

The high cost of overlooking new or existing registers that need to be context switched in a hardware state machine led GPU manufacturers to replace the hardware state machine with a microcode (μ-code) solution. Also known as firmware or a microprogram, μ-code may be thought of as software embedded in a hardware device, such as a read-only memory (ROM), a flash memory, or a memory block within a processing unit or an application specific integrated circuit (ASIC). Unlike the hardware state machine, μ-code can be compiled, stored within the GPU memory, and loaded at runtime during chip initialization. In this manner, the μ-code can be updated in the field to fix bugs such as adding registers missing from a list of registers that need to be context switched. The μ-code solution avoids having to resynthesize the silicon wafer.

No matter what type of method is used to generate a list of registers that need to be context switched, there are generally three recognized classes of state, or categories of registers, from the perspective of context switching for a given application as shown in FIG. 2a. These classes are registers that must be context switched (202), registers that can be context switched (204), and registers that must not be context switched (206). The objective is to include all of the registers that must be context switched in the list of registers to be context switched and nothing more as shown by the bracket 208 in FIG. 2a. Registers from the other two classes 204, 206 are typically not included in the list of registers to be context switched when this inclusive approach to generating such a list is taken.

As described above, however, some registers that must be context switched for another application may be overlooked and not manually added to the list of registers to be context switched. Such overlooked registers are illustrated in FIG. 2b by the inadequate "Switched" bracket 212. The "Forgotten" bracket 214 represents the missing portion of the registers that must be context switched 210, and registers within this bracket 214 may likely be responsible for context switching bugs. This register oversight may be more likely in applications with long lists of registers that must be context switched, and GPUs perform a lot of context switching compared to other types of processors.

Accordingly, what is needed is a more automatic method of generating a complete list of registers to be context switched that avoids omitting registers that must be context switched.

SUMMARY OF THE INVENTION

Embodiments of the present invention generally provide methods and apparatus for automatically generating a complete list of suitable circuit elements, such as registers, to be context switched that may help avoid omitting elements that must be context switched One embodiment provides a method of generating a list of elements to be context switched within a processor. The method generally includes creating a default list of elements for the processor that are to be switched by default, creating an exclusion list of elements that are not to be context switched. extracting a list of potential context switched elements from the default list, and removing the elements listed in the exclusion list from the list of potential context switched elements to create the list of elements to be context switched.

One embodiment provides a processor configured to perform exclusive context switching generally including a default list of elements for the processor that are to be switched by default and logic. The logic is generally configured to access an exclusion list of elements that are not to be context switched, extract a list of potential context switched elements from the default list, and remove the elements listed in the exclusion list from the list of potential context switched elements to create the list of elements to be context switched.

One embodiment provides a computer system capable of exclusive context switching generally including one or more memory devices and at least one processor device. The processor device is generally capable of executing instructions contained in the one or more memory devices, the processor device including logic configured to access an exclusion list of elements that are not to be context switched, extract a list of potential context switched elements from the default list, and remove the elements listed in the exclusion list from the list of potential context switched elements to create the list of elements to be context switched.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide an automatic method of generating a list of circuit elements to be context switched designed to avoid the omission of elements that must be context switched. The method generally involves creating a list of potential elements for context switching, assuming these elements will be context switched by default, and then excluding all elements that must not be context switched. Some elements that can be context switched may also be excluded for some embodiments.

Embodiments of the invention may apply to context switching of many different types of state such as static random access memory (SRAM) states, internal pipeline states, and register states of any type of processing device. However, context switching of register states of a graphics processing unit (GPU) will be discussed below as a specific application example.

Figure 1:
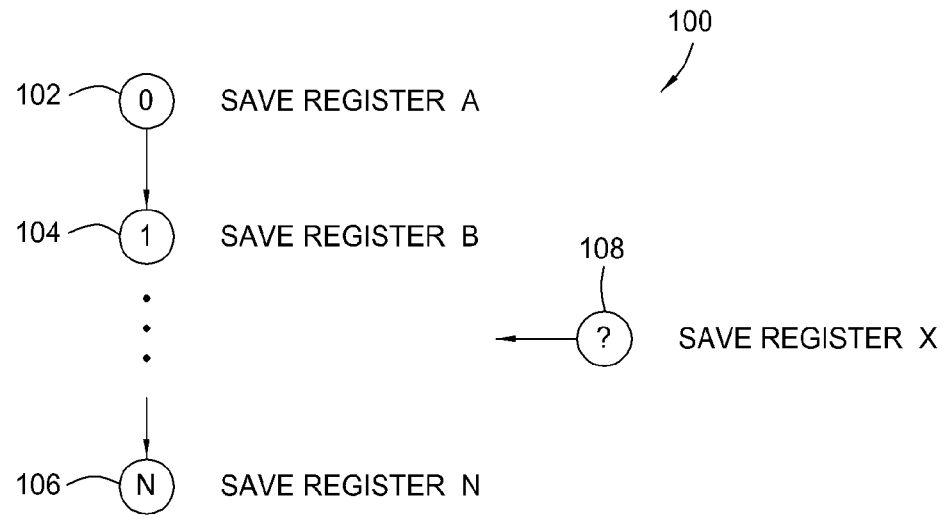
FIG. 1 is a prior art hardware state machine diagram for storing a list of registers that need to be context switched and an extra register that was overlooked.
Figure 2A:
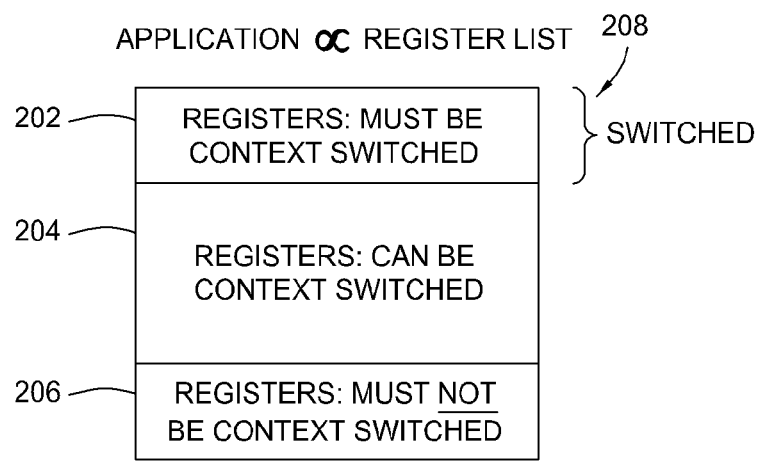
FIG. 2a is a prior art block diagram of different categories of registers from the perspective of context switching for a first given application illustrating a correct list of registers that will be context switched.

Even though the goal when creating a list of registers to be context switched for a given application may be only to list the registers that must be context switched 202 as shown in FIG. 2a, it may be safer to risk context switching registers that do not need to be context switched than to risk omitting registers that must be context switched. Although context switching registers that do not need to be context switched, and thus, can be context switched is safer than potentially omitting registers that must be context switched, context switching registers that can be context switched may waste GPU resources, may require additional registers to store the extraneous states, and may hinder performance in terms of speed, so unnecessary context switching should still be avoided whenever possible. In any case, there should not be a bug due to a state bleeding over into the next state after a context switch with this strategy. This type of approach may require an affirmative action by a user, such as a GPU developer, to create the list of registers to be context switched.

Figure 2B:
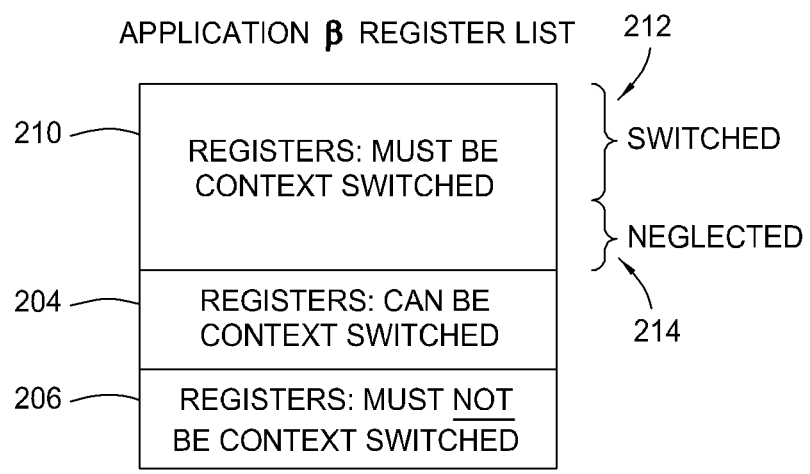
FIG. 2b is a prior art block diagram of different categories of registers from the perspective of context switching for a second given application illustrating an incorrect list of registers that will be context switched.
Figure 3A:
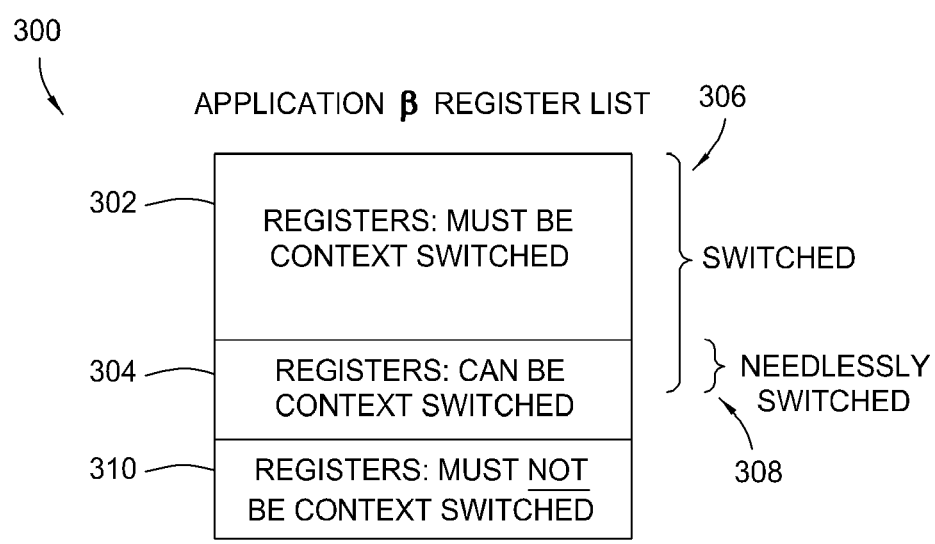
FIG. 3a is a block diagram of different categories of registers within a default register list from the perspective of context switching for the application of FIG. 2b illustrating an extended, but still correct list of registers that will be context switched according to one embodiment of the invention.

Revisiting the application of FIG. 2b, FIG. 3a portrays the same application β, but illustrates the generation of a different list of registers to be context switched according to embodiments of the invention. From the default list of all registers 300 in FIG. 3a, all of the registers that must be context switched 302, as well as a portion of the registers that can be context switched 304 may be included in the list of registers to be context switched as shown by the "Switched" bracket 306. The "Needlessly Switched" bracket 308 depicts the portion of the registers that can be context switched 304 that may have been needlessly incorporated into the list of registers to be context switched. The few registers that must not be context switched 310 should still be excluded from the list of registers to be context switched as shown.

Figure 3B:
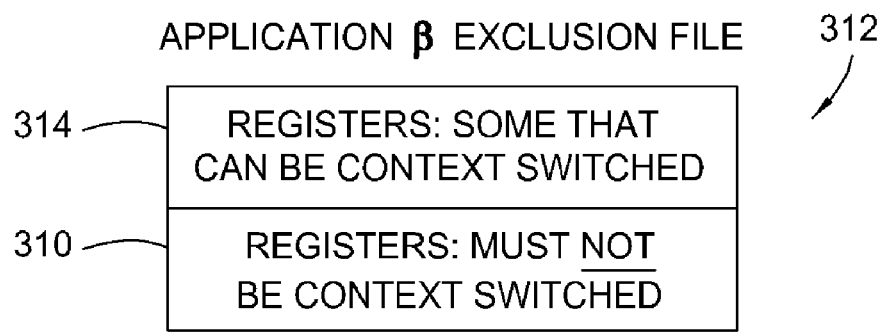
FIG. 3b is a block diagram of different categories of registers within an exclusion file for the application of FIG. 2b comprising a list of registers that will not be context switched according to one embodiment of the invention.
Figure 3C:
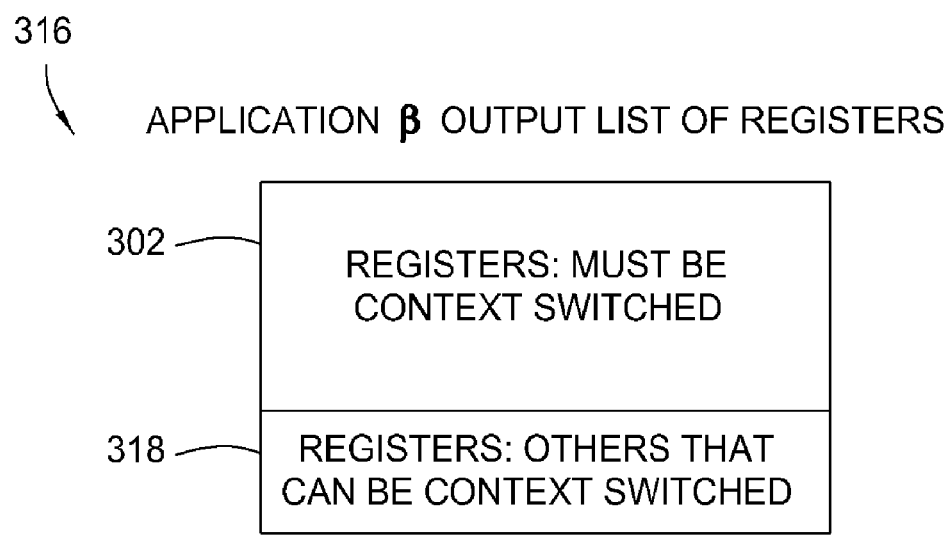
FIG. 3c is a block diagram of different categories of registers within an output list of registers that will be context switched after the exclusion file of FIG. 3b has been applied to the default register list of FIG. 3a according to one embodiment of the invention.

In this exclusive approach, an exclusion file 312 as shown in FIG. 3b may be applied to the default list of all registers 300. The exclusion file 312 may include a list of some registers 314 that can be context switched 304 and the list of registers that must not be context switched 310. The exclusion file 312 may be applied to the default list of all registers 300, and the lists of registers 310, 314 from the exclusion file 312 may be removed in an effort to generate an output list of registers 316 as shown in FIG. 3c. The output list of registers 316 may include the list of registers that must be context switched 302 and a list of other registers 318 that can be context switched. The list of other registers 318 may be the remaining portion of the list of registers that can be context switched 304 after the list of some registers 314 that can be context switched 304 is removed.

Figure 4:
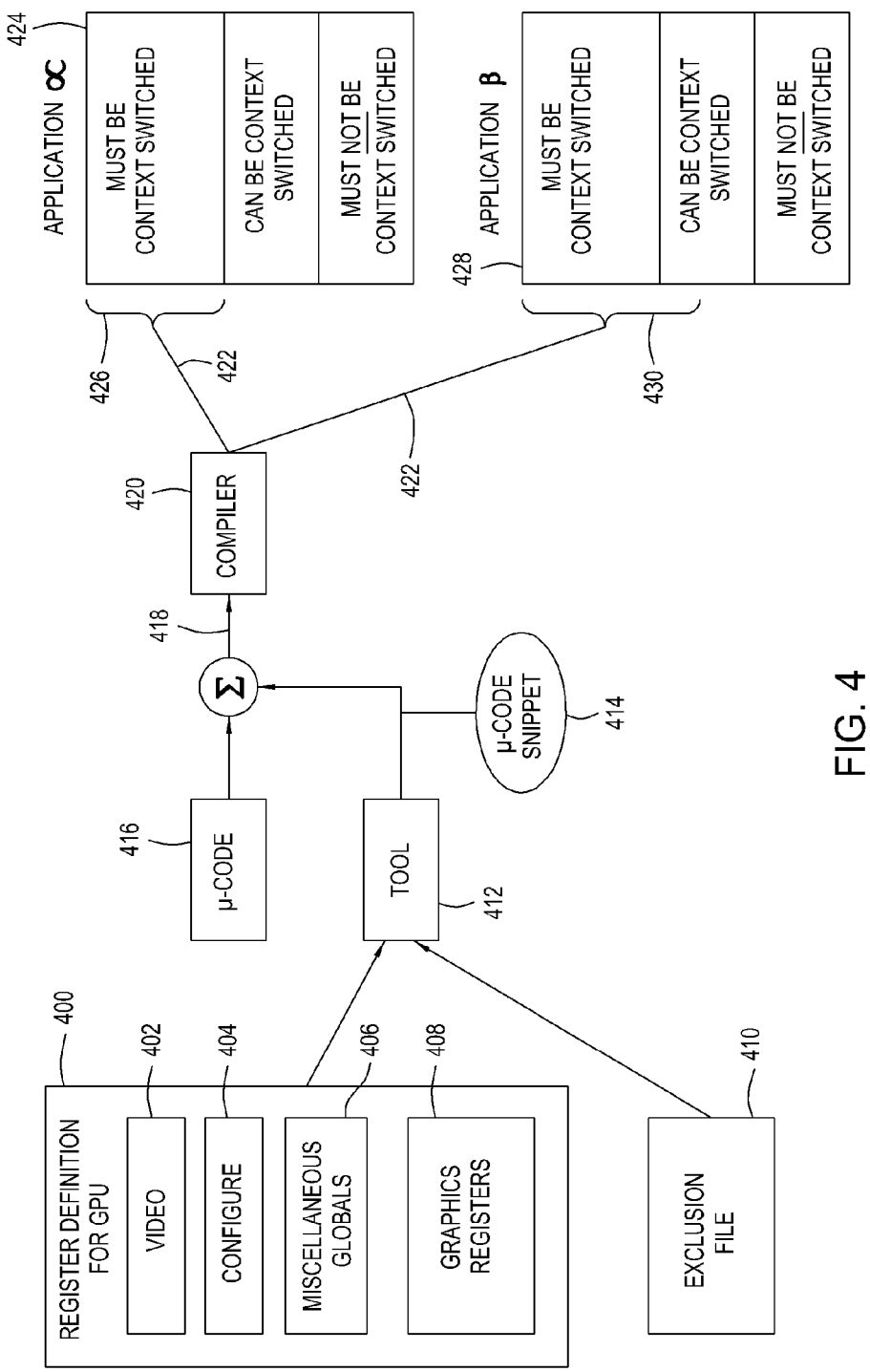
FIG. 4 is a block diagram of automatic list generation for states that will be context switched by excluding a portion of the graphics registers that do not need to be context switched and all of the graphics registers that must not be context switched using a methodology according to one embodiment of the invention.
Figure 5:
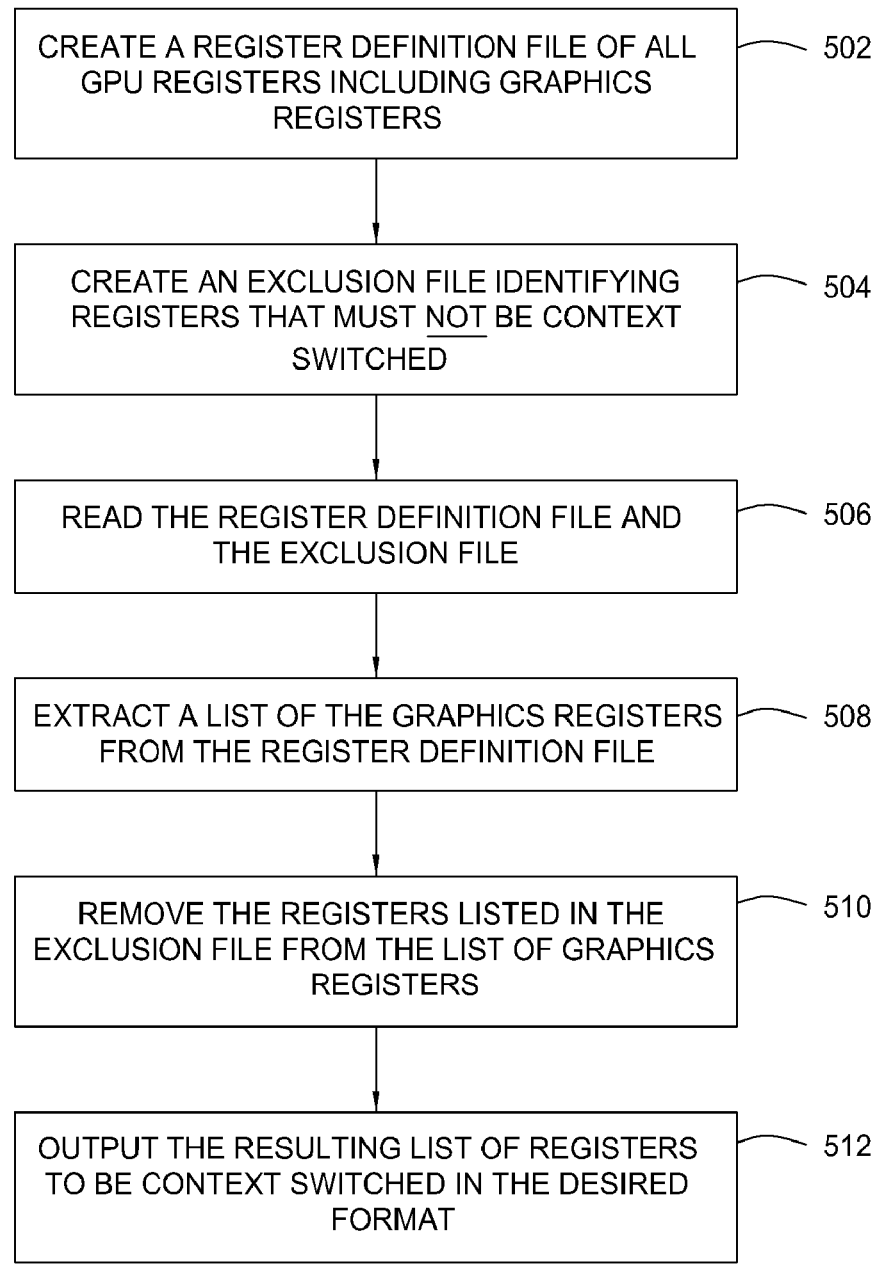
FIG. 5 is a flowchart depicting the automatic generation of states to be context switched in a graphics processing unit (GPU) according to one embodiment of the invention.

FIG. 4 is a block diagram of an automatic exclusive approach to generating a list of registers that will be context switched according to one embodiment of the invention. FIG. 5 is a flowchart depicting the automatic generation of registers to be context switched coinciding with the block diagram of FIG. 4. Thus, the operations of FIG. 5 may be explained with simultaneous reference to FIG. 4. Both FIG. 4 and FIG. 5 may apply to other states that need to be context switched besides register states, but register states will be described below to facilitate understanding.

Before any operations can be performed, a register definition file 400 may be created in step 502. The register definition file 400 may be a database or a spreadsheet listing all of the registers and associated properties for a GPU, and the file 400 may consist of video registers 402, configuration registers 404, miscellaneous global registers 406, and graphics registers 408. Up to 90% of the graphics registers 408 may need to be context switched. Even though register definition files 400 may have been created during prior art GPU development, the same type of register definition file 400 with the same fields or column headings may be used by some embodiments of the invention. For some embodiments, minor changes and/or additions to the fields or column headings contained in prior art register definition files 400 may be necessary to automatically extract the pertinent information.

In step 504, an exclusion file 410 may be created listing all of the graphics registers 408 that must not be context switched. The exclusion file 410 may include none, some, or all of the graphics registers 408 that can be context switched, but should not include any of the graphics registers 408 that must be context switched. Since the majority of graphics registers 408 in a GPU may need to be context switched, the exclusion file 410 may be shorter than the inclusion file of prior art and hence, less error-prone and more easily checked by designers.

In step 506, a tool 412 may read the register definition file 400 and the exclusion file 410. The tool 412 may be any suitable executable program, such as a software script. The tool 412 may extract the graphics registers 408 from the register definition file 400 and create a list of graphics registers in step 508. For some embodiments, the tool 412 may automatically determine the set of graphics registers 408 within the register definition file 400 by using some suitable attribute or combination of attributes of the graphics registers 408. This attribute or combination may include an address range or a subset of the register name.

After the list of graphics registers has been created, the tool 412 may remove registers from this list that are recorded in the exclusion file 410 in step 510. The resulting automatically generated list should contain all of the registers that must be context switched. For some embodiments, such an output list of registers to be context switched may also contain some or all of the registers that can be context switched. In step 512, the tool 412 may then translate the list of registers to be context switched into a microcode (μ-code) snippet 414.

The μ-code snippet 414 may be combined with existing GPU μ-code 416. The combined μ-code 418 may be sent to a compiler 420 for translation into a lower level language understood by the GPU. The compiled code 422 may be stored in the GPU's internal memory or an external memory location where it may be loaded at runtime during initialization of the GPU chip. For some applications, such as application α 424, the compiled code may only context switch registers that must be switched as delineated by the bracket 426. For other applications, such as application β 428, the compiled code may context switch registers that must be context switched and some registers that can be context switched as depicted by the bracket 430.

For any new registers added after release, the tool 412 may be run again on an updated register definition file 400 and, if necessary, an updated exclusion file 410. The new compiled code may be updated on GPUs in the field. An updated exclusion file 410 should only be necessary if a new graphics register that must not be context switched is added. It may be up to the designer if new registers that can be context switched should be added to the exclusion file 410.

For some other embodiments that do not employ μ-code, the tool 412 may output a firmware state machine or a portion of such a state machine to automatically configure a hardware state machine with a list of registers to be context switched before wafer fabrication of a GPU.

One benefit of the exclusion approach using the tool 412 and the exclusion file 410 according to embodiments of the invention may be that any accidental omissions of graphics registers 408 from the register definition file 400 should lead to correct context switching since these overlooked registers are not excluded from being context switched as in prior art. Furthermore, with the majority of the graphics registers 408 needing to be context switched, chances should be that any new registers added during the design phase or even after release will most likely need to be context switched. A new exclusion file may not have to be generated for such new registers, which also may reduce the chance for potential errors and the number of field upgrades.

While the foregoing is directed to embodiments of the present invention, other and further embodiments of the invention may be devised without departing from the basic scope thereof, and the scope thereof is determined by the claims that follow.

The invention claimed is:

1. A method of generating a list of state elements to be context switched within a graphics processing unit, comprising:

creating a default list of state elements within the graphics processing unit that are to be context switched by default;

creating an exclusion list of state elements that are not to be context switched, wherein the exclusion list is independent of any application that is executed by the graphics processing unit;

extracting a list of potential context switched state elements from the default list;

removing all of the state elements listed in the exclusion list from the list of potential context switched state elements to create the list of state elements to be context switched; and translating the list of elements to be context switched into a format for input to a compiler that is configured to generate compiled code for execution by the graphics processing unit.

2. The method of claim 1 wherein the default list of state elements comprises at least one of a list of registers, a list of internal pipeline elements, and a list of static random access memory (SRAM) cells.

3. The method of claim 1, wherein the default list of state elements to be context switched comprises a list of registers in the graphics processing unit and is contained in a file including at least one property attributed to each register in the default list.

4. The method of claim 3, wherein the property attributed to each register in the default list is used for extracting a list of graphics registers.

5. The method of claim 3, wherein the at least one property is an address range.

6. The method of claim 3, wherein the at least one property is a subset of a register name.

7. The method of claim 1, further comprising the step of combining the list of state elements translated into the format with existing graphics processing unit microcode to generate combined microcode for execution by the graphics processing unit.

8. The method of claim 7, wherein the combined microcode is accessible by a microcode engine within the graphics processing unit that performs context switching.

9. The method of claim 7, further comprising the step of executing the combined microcode during initialization of the graphics processing unit.

10. The method of claim 1, wherein the format is firmware to configure a hardware state machine in the graphics processing unit.

11. The method of claim 1, wherein the exclusion list includes a register that can be context switched, but is not required to be context switched.

12. The method of claim 1, further comprising the steps of:
- defining a new state element that is within the graphics processing unit;
- creating an updated default list of state elements that includes the new state element;
- creating an updated exclusion list of state elements that are not to be context switched;
- extracting an updated list of potential context switched state elements from the updated default list;
- removing all of the state elements listed in the updated exclusion list from the updated list of potential context switched state elements to create an updated list of state elements to be context switched; and
- translating the updated list of elements to be context switched into the format for input to the compiler that is configured to generate updated compiled code for execution by the graphics processing unit.

13. A computer system capable of exclusive context switching, comprising:
- one or more memory devices; and
- at least one processor device capable of executing instructions contained in the one or more memory devices, the processor device including logic configured to access an exclusion list of state elements that are not to be context switched, wherein the exclusion list is independent of any application that is executed by the processor, access a default list of state elements within the processor that are to be context switched by default, extract a list of potential context switched state elements from the default list, remove all of the state elements listed in the exclusion list from the list of potential context switched state elements to create the list of state elements to be context switched, and translate the list of state elements to be context switched into a format for input to a compiler that is configured to generate compiled code for execution by the processor device.

14. The system of claim 13, wherein the default list of state elements comprises at least one of a list of registers, a list of internal pipeline elements, and a list of static random access memory (SRAM) cells.

15. The system of claim 13, wherein the processor is a graphics processing unit (GPU).

16. The system of claim 13, wherein the compiler is further configured to combine the list of state elements translated into the format with existing processor microcode to generate combined microcode for execution by the processor.

17. The system of claim 16, wherein the graphics processing unit further comprises a microcode engine configured to access the combined microcode and perform context switching based on the list of state elements to be context switched.

18. The system of claim 13, wherein the default list of state elements to be context switched comprises a list of registers in the processor having addresses within an address range indicating that the state elements are graphics registers.

19. The system of claim 13, wherein the format is firmware to configure a hardware state machine in the processor.

20. The system of claim 13, wherein the default list of state elements to be context switched comprises a list of registers in the processor having a subset of a register name indicating that the state elements are graphics registers.

* * * * *